United States Patent [19]

O'Young et al.

[11] Patent Number: 5,578,282
[45] Date of Patent: Nov. 26, 1996

[54] OCTAHEDRAL MOLECULAR SIEVE POSSESSING (4×4) TUNNEL STRUCTURE AND METHOD OF ITS PRODUCTION

[75] Inventors: Chi-Lin O'Young, Poughkeepsie, N.Y.; Steven L. Suib, Storrs, Conn.

[73] Assignee: Texaco Inc., White Plains, N.Y.

[21] Appl. No.: 335,498

[22] Filed: Nov. 7, 1994

[51] Int. Cl.$^6$ .......................... C01G 45/00; C01G 45/12
[52] U.S. Cl. ............................................. 423/50; 423/599
[58] Field of Search .............................. 423/50, 605, 599

[56] References Cited

U.S. PATENT DOCUMENTS

| | | | |
|---|---|---|---|
| 1,221,061 | 4/1917 | Kaplan | 423/605 |
| 3,004,928 | 10/1961 | Haines et al. | 423/605 |
| 3,214,236 | 10/1965 | Weisz | 423/213.2 |
| 4,277,360 | 7/1981 | Mellors et al. | 423/605 |
| 4,551,254 | 11/1985 | Imada et al. | 423/605 |
| 5,340,562 | 8/1994 | O'Young et al. | |

FOREIGN PATENT DOCUMENTS

| | | | |
|---|---|---|---|
| 1157590 | 11/1963 | Germany | 423/605 |
| 273048 | 11/1989 | Germany | 423/605 |
| 783236 | 11/1980 | U.S.S.R. | 423/605 |

OTHER PUBLICATIONS

Giovanoli et al., "A New Synthesis of Hollandite, A Possibility for Immobilization of Nuclear Waste", *Chimia*, 35, (1981) pp. 53–55, no month.

Chang et al., "Manganese Modules as Demetalation Catalysts", no Journal, no date.

Shen et al., "Manganese Oxide Octahedral Molecular Sievens: Preparation, Characterization, and Application", *Science*, Apr. 23, 1993, vol. 260, pp. 511–515.

Yin et al., "Temperature Program Desorption and Reduction Studies of Octahedral Molecular Sieves", J. Weitkamp et al. (Eds.) *Zeolites and Related Microporous Materials: State of the Art 1994* Studies in Suface Science and Catalysis, vol. 84, 1994 Elsevier Science B.V., no month, pp. 453–460.

Chi–Lin O'Young, "Hydrothermal Synthesis of Manganese Oxides with Tunnel Structures", *Synthesis of Microporous Materials*, vol. II, pp. 333–340, M. L. Occelli, H. S. Robson Eds., Van Nostrand Reinhold, NY, 1992, no month.

De Guzman et al., "Role of Cyclic Voltammetry in Characterizing Solids: Natural and Synthetic Manganese Oxide Octahedral Molecular Sieves", *Chemistry of Materials*, American Chemical Society, 1993, vol. 5, pp. 1395–1400, no month.

Shen et al., "Octahedral Molecular Sieves: Preparation, Characterization and Applications", *J. Chem Soc., Chem. Communications*, Issue 17, 1992, pp. 1213–1214, no month.

Shen et al., "Synthetic Todorokite: Preparation, Characterization and Applications", *Ninth International Zeolite Conference, Extended Abstracts and Program*, Higgins et al. Eds., 1992, RP230, no month.

(List continued on next page.)

*Primary Examiner*—Steven Bos
*Attorney, Agent, or Firm*—Kenneth R. Priem; Dominick G. Vicari

[57] ABSTRACT

A new class of manganese oxide octahedral molecular sieves possess a (4×4) tunnel structure. The molecular sieves possess the general composition $$A_aM_bMn_{16-b}O_{32}n \cdot H_2O$$

wherein A is +1, +2, +3 or +4 tunnel cation or combination thereof, $0 \leq a \leq 8$, M is +1, +2, +3 or +4 framework-substituting metal cation or combination thereof, $0 \leq b \leq 16$ and $n \geq 0$.

A method of producing the molecular sieves includes the steps of dissolving a manganese salt in an organic solvent, e.g., ethanol, adding a permanganate salt to the resulting solution to provide a solid intermediate which is recovered and heated to a temperature which results in producing an octahedral molecular sieve having a (4×4) tunnel structure.

The molecular sieves are useful in such applications as oxidation catalysis, hydrocarbon conversion, adsorption and electrochemical sensors.

17 Claims, 3 Drawing Sheets

OTHER PUBLICATIONS

Shen et al., "Synthesis of Manganese Oxide Octahedral Molecular Sieves (OMS)", *Zeolites and Microporous Crystals,* 1994, pp. 19–24, no month.

Turner et al., "Todorokites: A New Family of Naturally Occurring Manganese Oxides", Science, vol. 212, pp. 1024–1027, 29 May 1981.

OCTAHEDRAL MOLECULAR SIEVE POSSESSING (4×4) TUNNEL STRUCTURE AND METHOD OF ITS PRODUCTION

BACKGROUND OF THE INVENTION

This invention relates to a new class of manganese oxide octahedral molecular sieves (OMS) possessing a (3×4) tunnel structure and to a method for their production.

Manganese oxide octahedral molecular sieves possessing mono-directional tunnel structures constitute a family of molecular sieves wherein chains of $MnO_6$ octahedra share edges to form tunnel structures of varying sizes. Such materials have been detected in samples of terrestrial origin and are also found in manganese nodules recovered from the ocean floor. Manganese nodules have been described as useful catalysts in the oxidation of carbon monoxide, methane and butane (U.S. Pat. No. 3,214,236), the reduction of nitric oxide with ammonia (*Atmospheric Environment*, Vol. 6, p. 309 (1972)) and the demetallation of topped crude in the presence of hydrogen (*Ind. Eng. Chem. Proc. Dev.*, Vol. 13, p.315 (1974)).

The hollandites are naturally occurring hydrous manganese oxides with tunnel structures (also described as "framework hydrates") in which Mn can be present as $Mn^{4+}$ and other oxidation states, the tunnels can vary in size and configuration and various mono- or divalent cations can be present in the tunnels. The hollandite structure consists of double chains of $MnO_6$ octahedra which share edges to form (2×2) tunnel structures. The average size of these tunnels is about 4.6 Å square. Ba, K, Na and Pb ions are present in the tunnels and coordinated to the oxygens of the double chains. The identity of the tunnel cations determines the mineral species. Specific hollandite species include hollandite ($BaMn_8O_{16}$), cryptomelane ($KMn_8O_{16}$), manjiroite ($NaMn_8O_{16}$) and coronadite ($PbMn_8O_{16}$).

The hydrothermal method of synthesizing a manganese oxide octahedral molecular sieve possessing (2×2) tunnel structures such as those possessed by the naturally-occurring hollandites is described in "Hydrothermal Synthesis of Manganese Oxides with Tunnel Structures," in *Synthesis of Microporous Materials*, Vol. II, 333, M. L. Occelli, H. E. Robson Eds. Van Nostrand Reinhold, N.Y., 1992. Such synthetic octahedral molecular sieves having (2×2) tunnel structures are referred to in the art by the designation OMS-2. The (2×2) tunnel structure of OMS-2 is diagrammatically depicted in FIG. 1A.

The hydrothermal method of producing OMS-2 involves autoclaving an aqueous solution of manganese cation and permanganate anion under acidic conditions, i.e., pH<3, at temperatures ranging from about 80° to about 140° C. in the presence of counter cations having ionic diameters of between about 2.3 and about 4.6 Å. The counter cations can serve as templates for the formation of OMS-2 product and be retained in the tunnel structures thereof. Based on analytical tests, OMS-2 produced via this method is thermally stable up to about 600° C.

Alternatively, OMS-2 can be produced by the method disclosed in R-Giovanili and B. Balmer, *Chimia*, 35 (1981) 53. Thus, when manganese cation and permanganate anion are reacted under basic conditions, i.e., pH>12, a layered manganese oxide precursor is produced. This precursor is ion exchanged and then calcined at high temperatures, i.e., temperatures generally exceeding about 600° C., to form OMS-2 product. Analytical tests indicate that OMS-2 produced via this method is thermally stable up to about 800° C. and the average oxidation state of manganese ion is lower.

The todorokites are naturally occurring manganese oxides with (3×3) tunnel structures formed by triple chains of $MnO_6$ edge-sharing octahedra. Todorokites and related species are described by Turner et al. in "Todorokites: A New Family of Naturally Occurring Manganese Oxides", *Science*, Vol. 212, pp. 1024–1026 (1981). The authors speculate that since todorokites are often found in deep-sea manganese nodules containing high concentrations of copper and nickel, it is probable that such metals substitute for $Mn^{+2}$ in the octahedral framework.

Todorokites have attracted particular interest because of their relatively large tunnel dimension and their cation-exchange behavior which is similar to that of zeolites (Shen et al., "Manganese Oxide Octahedral Molecular Sieves: Preparation, Characterization, and Applications", *Science*, Vol. 260, pp. 511–515 (1993)). The naturally occurring todorokites are poorly crystalline, impure in composition and coexist with other manganese oxide minerals. Results of high resolution transmission electron microscopy (HRTEM) show that todorokite contains random intergrowth material of 3×2, 3×3, 3×4 and 3×5 tunnel structure. Because of their disordered structure, the todorokites exhibit variable and non-reproducible catalytic activity, a drawback which militates against their commercial use.

A method of synthesizing a manganese oxide octahedral molecular sieve possessing (3×3) tunnel structures such as those possessed by the naturally-occurring todorkites is described in U.S. Pat. No. 5,340,562. Such synthetic octahedral molecular sieves having (3×3) tunnel structures are referred to in the art by the designation OMS-1. The (3×3) tunnel structure of OMS-1 is diagrammatically depicted in FIG. 1B.

OMS-1 can be prepared by reacting manganese cation and permanganate anion under strongly basic conditions to form a layered manganese oxide precursor, thereafter aging the precursor at room temperature for at least 8 hours, ion-exchanging the aged precursor and then autoclaving the ion-exchanged precursor at from about 150° to about 180° C. for several days. Analytical tests indicate that OMS-1 produced via this method is thermally stable up to about 500° C.

Methods of substituting the frameworks of OMS-1 and OMS-2 with a metal other than manganese are described in commonly assigned, copending U.S. appln. Ser. No. 08/215,496.

SUMMARY OF THE INVENTION

In accordance with the present invention an octahedral molecular sieve possessing a (4×4) tunnel structure is provided. The molecular sieve possesses the general formula:

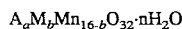

$$A_aM_bMn_{16-b}O_{32} \cdot nH_2O$$

wherein A is a +1, +2, +3 or +4 tunnel cation or combination thereof, $0<a\leq 8$, M is a +1, +2, +3 or +4 framework-substituting metal cation or combination thereof, $0<b<16$ and and $n\geq 0$. The octahedral molecular sieve herein possesses an average pore diameter of about 9.2 Å. The manganese oxide octahedral molecular sieve of this invention possesses a highly uniform and homogeneous structure, i.e., one made up substantially entirely of (4×4) tunnel structure species without admixture of any significant amount of other tunnel structure species.

The novel manganese oxide octahedral molecular sieve of this invention, which shall be referred to throughout the specification by the designation OMS-3, can be prepared by the method which comprises:

a) dissolving a manganese salt in an organic solvent to form a solution;

b) adding a permanganate salt to the solution to form a solid intermediate;

c) recovering the intermediate; and, d) heating the intermediate at temperatures effective to produce the desired OMS-3 product.

OMS-3 can be effectively utilized in a wide variety of applications such as oxidation catalysis, hydrocarbon conversion, adsorption and electrochemical sensors.

DETAILED DESCRIPTION OF THE INVENTION

According to the present invention, a manganese oxide octahedral molecular sieve is provided which possesses unique (4×4) tunnel structures. The molecular sieve possesses the general formula:

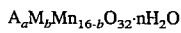

Figure 1A:
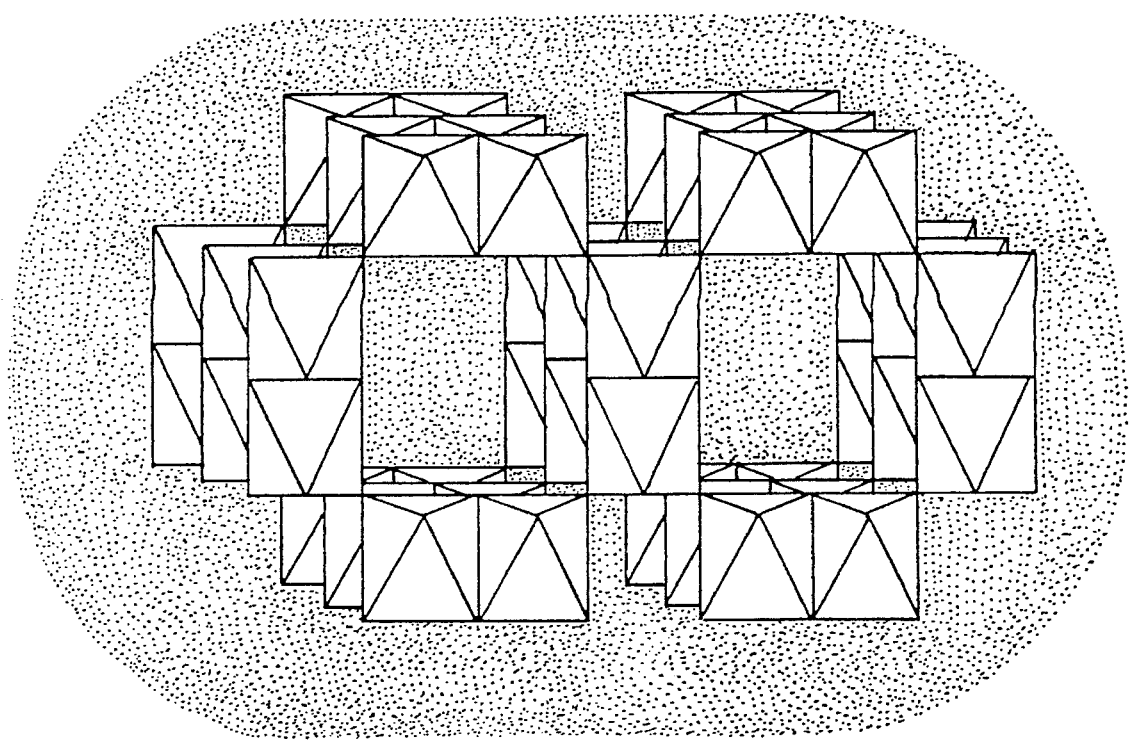
FIGS. 1A and 1B are diagrammatic representations of OMS-2 and OMS-1, respectively.
Figure 1B:
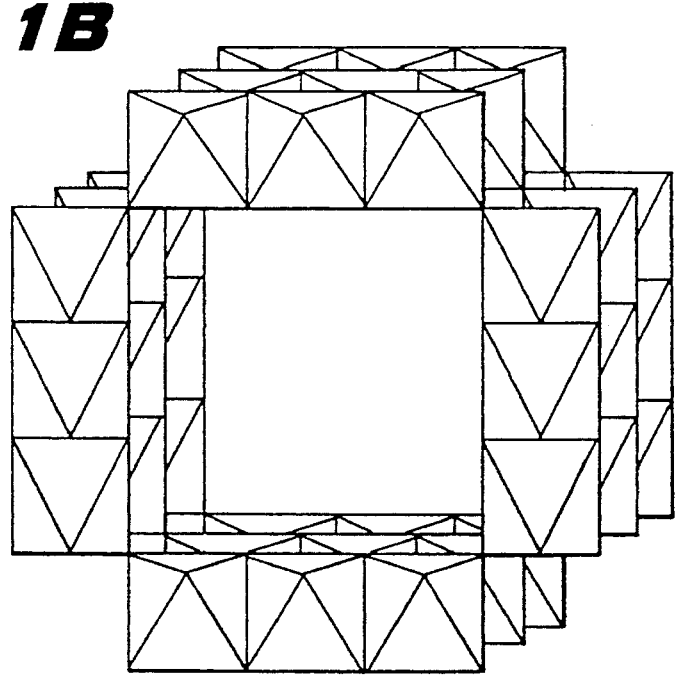
Figure 2:
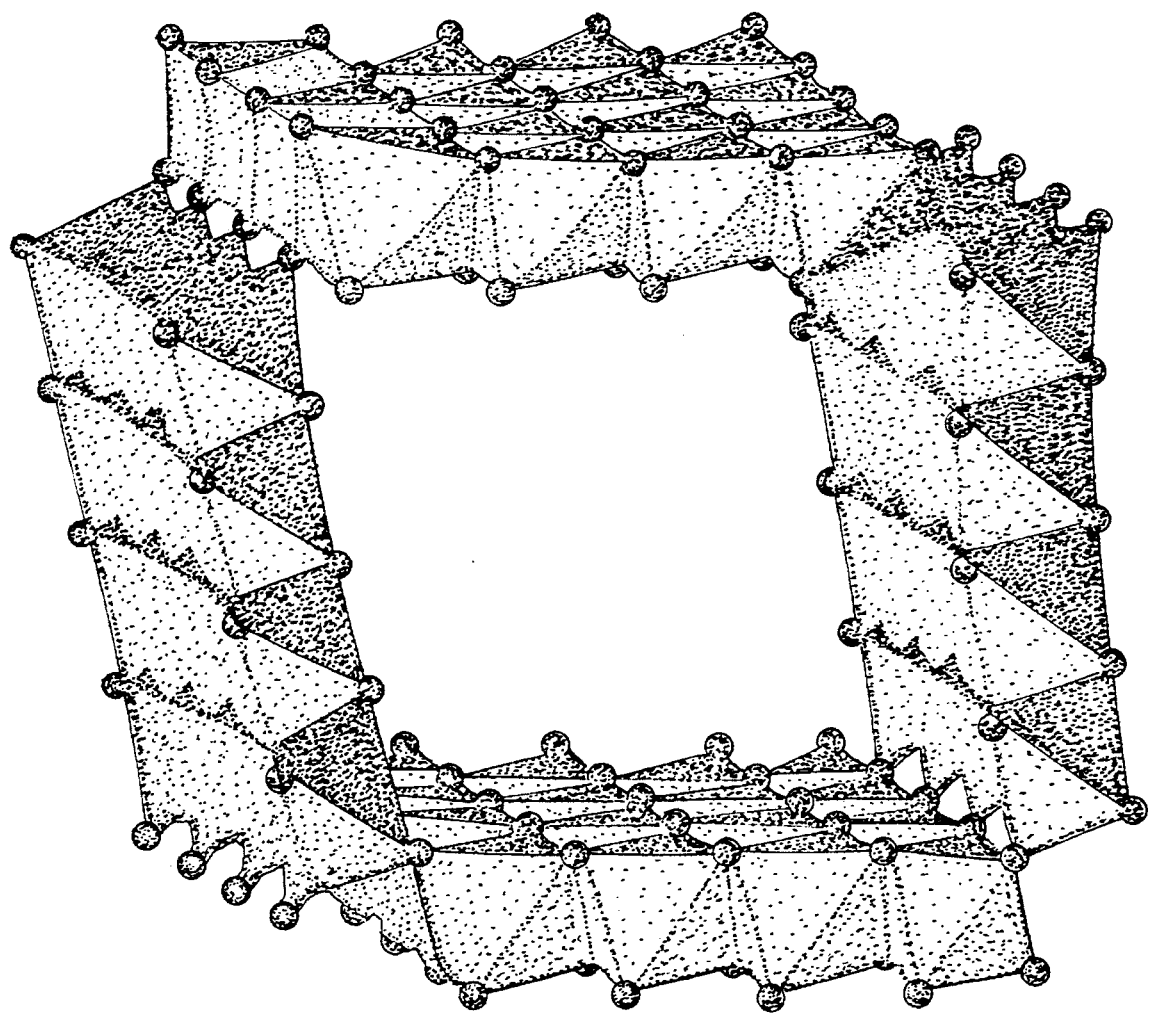
FIG. 2 is a diagrammatic representation of OMS-3.
Figure 3:
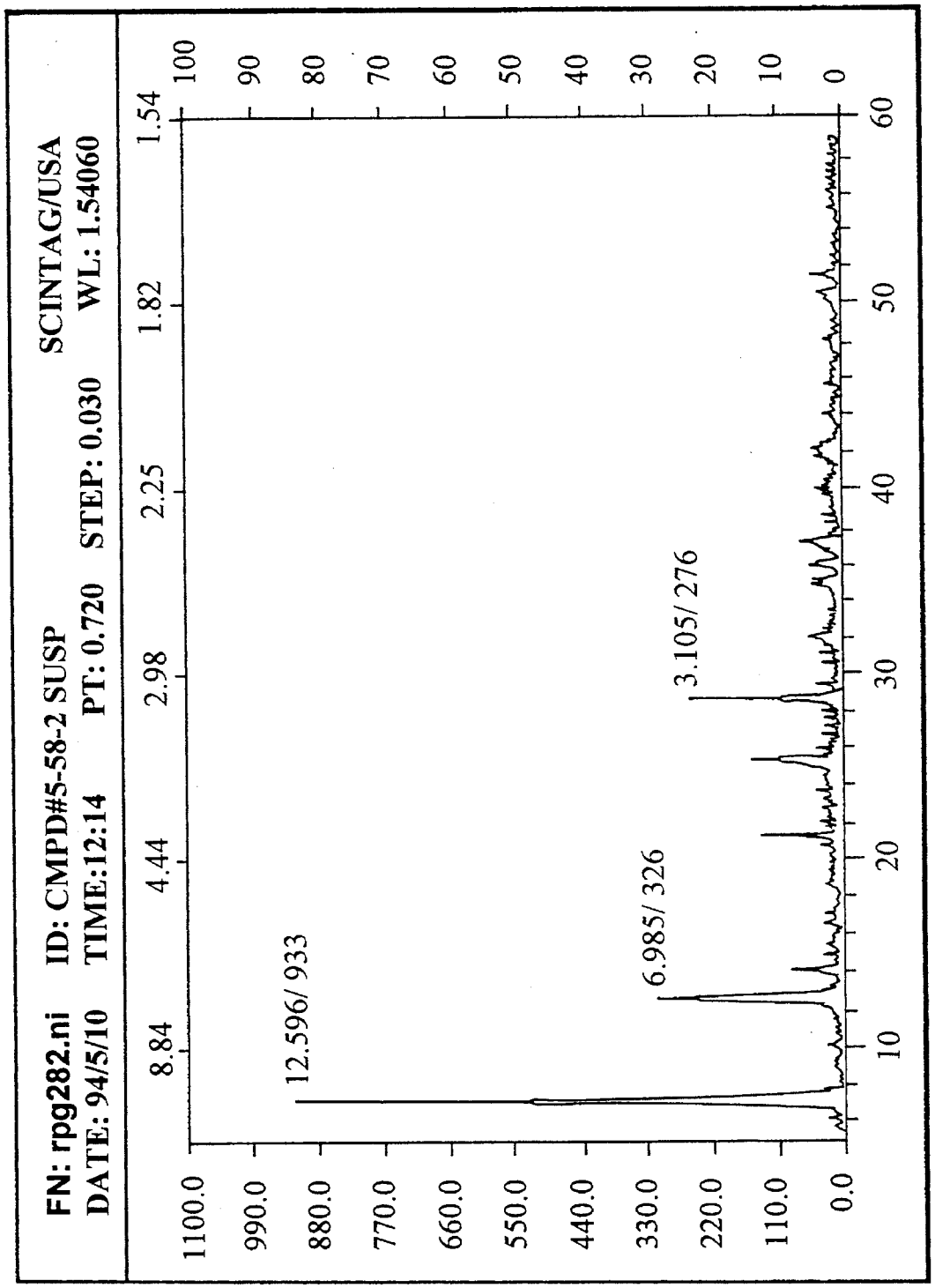
FIG. 3 presents the x-ray powder diffraction pattern of OMS-3 produced in accordance with the method of this invention.

$A_a M_b Mn_{16-b} O_{32} \cdot nH_2O$ wherein A is a +1, +2, +3 or +4 tunnel cation or combination thereof, $0 < a \leq 8$, M is a +1, +2, +3 or +4 framework-substituting metal cation or combination thereof, $0 < b < 16$ and $n \geq 0$. OMS-3 is characterized by the (4×4) tunnel structure which is diagrammatically depicted in FIG. 2. In FIG. 3, the x-ray powder diffraction pattern of OMS-3 is presented, thus confirming its structure as having (4×4) tunnel structures. Preferably, the manganese oxide octahedral molecular sieve is provided with tunnel-substituting and/or framework-substituting metal cations as more fully described hereinbelow. It is believed that the presence of these additional cations will enhance the crystallinity, stability and catalytic effectiveness of the resulting OMS-3 product.

The octahedral molecular sieve of this invention is produced by the method comprising:

a) dissolving a manganese salt in an organic solvent to form a solution;

b) adding a permanganate salt to the solution to form a solid intermediate;

c) recovering the intermediate; and, d) heating the intermediate at a temperature effective to produce the desired OMS-3 product.

In general, any organic solvent-soluble manganese salt, whether inorganic or organic, can be employed herein so long as it is soluble in the organic solvent. Suitable salts include, for example, the sulfate, nitrate and perchlorate salts and salts of organic acids such as acetates.

The permanganate salt is likewise not limited so long as it is soluble in the organic solvent. In general, the permanganate salt can be an alkali or alkaline earth metal permanganate such as the permanganates of sodium, potassium, cesium, magnesium, calcium and barium. Ammonium or tetraalkylammonium permanganates can also be employed. The counter ions of the aforementioned permanganates, i.e., alkali metal cations, alkaline earth metal cations, ammonium cations and tetraalkylammonium cations, often enhance dissolution of the permanganate anion in the organic solvent. In some cases, the counter ions, especially in the case of the larger counter ions such as potassium and barium, serve as templates for crystallization of OMS-3 product and will remain in the tunnel structures of OMS-3 as tunnel cations. Therefore, the particular permanganate salt employed in the practice of this invention can be selected for its ability to facilitate the formation and stabilization of the desired OMS-3 product. Where a smaller counter ion, for example, sodium cation and/or magnesium cation, is utilized, the counter ion can have the desirable effect of allowing template materials other than the counter ion to affect the formation of OMS-3. The ionic diameters of some alkali and alkaline earth metal cations which can be employed are listed below:

| Cation | $Li^+$ | $Na^+$ | $K^+$ | $Cs^+$ | $Mg^{2+}$ | $Ca^{2+}$ | $Ba^{2+}$ |
|---|---|---|---|---|---|---|---|
| r(Å) | 1.36 | 1.96 | 2.66 | 3.78 | 1.30 | 1.98 | 2.70 |

Template materials which can be employed in producing OMS-3 include the tetraakylammonium salts in which the alkyl groups can contain from 1 to about 5 carbon atoms, can be the same or different and can be normal or branched in structure. Methyl, ethyl and propyl groups are representative alkyl groups which can advantageously be employed herein. The anion of the aforementioned salts can be any suitable inorganic or organic ion which will dissolve and remain in solution without interfering with the reaction or, optionally, form a precipitate with the counter ion of the permanganate salt employed in the method herein. Examples of such anions include the halides, hydroxides, bisulfates, sulfates, perchlorates, acetates and the like.

Also useful as organic templates are polymer chains containing synthetic polymers such as those described as cationic polymers, quaternary ammonium polymers and ionene polymers by Daniels et al. in "Cationic Polymers as Templates in Zeolite Crystallization, "J. Am. Chem. Soc. 100, pp. 3097–3100 (1978) and Davis et al. in "Synthesis of Gmelinite and ASM-12 Zeolites with a Polymer Template," J. Chem. Soc., Chem. Commun. 1988, pp. 920–921.

In another embodiment of this invention, the framework of OMS-3 is substituted with transition metal cation(s). The transition metal cation is incorporated into the framework of OMS-3 by co-dissolving a transition metal salt in the organic solvent used to dissolve the manganese salt. The transition metal cation(s), which can be designated as $M^{+n}$ (where M indicates the transition metal and n indicates an oxidation state which is stable in the organic solvent solution), can be any metal selected from Groups IIIA, IVA, VA, VIA, VIIA, VIIIA, IB and IIB of the Periodic Table of the Elements. Preferably, the transition metal is a metal selected from Groups 1B, IIB and VIIIA of the Periodic Table of the Elements. Examples of useful framework-substituting transition metals include Mg, Fe, Co, Ni, Cu, Ti, V, Cd, Mo, W, Cr, Zn, La, Ir, Rh, Pd and Pt. Preferred metals include Co, Cu, Ni, Zn, La and Pd. Transition metal cation(s) $M^{+n}$ should be present in the organic solvent in a concentration effective to introduce the desired proportions of the metal(s) into the framework of OMS-3 structure during the course of the reaction. Therefore, any suitable salt (inorganic or organic) of the selected metal(s) can be used which is sufficiently soluble provided, of course, that the anion does not interfere with the other reactants or the course of the reaction. For example, the nitrates, sulfates, perchlorates, alkoxides, acetates, and the like, can be used with generally good results.

The preferred synthesis of OMS-3 initially involves dissolving a manganese salt in a lower alkanol as solvent. Examples of manganese salts which can be employed include $MnCl_2$, $Mn(NO_3)_2$, $MnSO_4$, $Mn(CH_3COO)_2$, and the like, with $Mn(CH_3COO)_2$ being preferred. Suitable lower alkanols include those of the general formula $R-[OH]_n$ wherein R is straight-chain $C_1-C_6$ alkyl and n is 1 or 2. Ethanol is preferably employed. Thereafter, a permanganate salt is added to the solution, resulting in the formation of a solid intermediate. Suitable permanganate salts include $Na(MnO_4)$, $KMnO_4$, $Mg(MnO_4)_2$, etc., with $KMnO_4$ providing particularly good results. The solution is preferably heated during the reaction under stirring. After the formation of a solid intermediate, the heat is removed and the remaining solvent is allowed to evaporate at room temperature. The solid intermediate is thereby recovered and preferably allowed to age at room temperature for a period of time ranging from about 1 to about 14 days, and preferably from about 6 to about 8 days. The aged solid intermediate is then gradually heated from room temperature to a temperature generally ranging from about 200° to about 800° C., with temperatures ranging from about 500° C. to about 700° C. being preferred, to provide the desired OMS-3 product. The heating step will generally take from about 0.1 to about 10, preferably from about 0.5 to about 3, hours.

As the example which follows demonstrates, x-ray powder diffraction (XRD) patterns of products resulting from the method disclosed herein verify the presence (4×4) tunnel structures therein.

The octahedral molecular sieve of this invention possesses acid sites, including Lewis and Bronsted sites. Applications include catalyzed reactions, e.g., isomerization and polymerization, and adsorption. Specific examples of catalysis and adsorption applications of OMS-3 include the decomposition of alcohol, oxidation of CO, dehydrogenation of hydrocarbons, reduction of NO, hydrogenation of olefins, demetallation of petroleum residua, decomposition of organic sulfur compounds, decomposition of organic nitrogen compounds, decomposition of asphalt, adsorption of noxious gases and adsorption of heavy metal ions.

The following examples are presented to illustrate specific embodiments of the practice of this invention and are not to be interpreted as limitations upon the scope of the invention.

Example 1: Preparation of OMS-3

Ethanol (500 mL) was introduced to a 600 mL beaker, heated to a gentle boil and stirred with a magnetic stirring bar. $Mn(OAc)_2 \cdot 4H_2O$ (0.74 g) was added to the ethanol solution until it dissolved. After dissolution of $Mn(OAc)_2 \cdot 4H_2O$, $KMnO_4$ (0.32 g) was added to the solution which then turned dark brown after 15 seconds and black after 3 minutes. The solution was heated to a gentle boil with stirring and covered with a watch glass for 1 hour. After 1 hour, the watch glass was removed and the solution was heated uncovered until about 100 mL of solution was left. The beaker was then removed from heat and the remaining solvent was allowed to evaporate uncovered at room temperature. A shiny black solid was recovered and allowed to age at room temperature for 7 days. After 7 days, the shiny black solid was removed and placed in a furnace. During heating, the solid was crushed and stirred with a spatula three times. The solid was heated up to 700° C. by starting the heating at room temperature and increasing the temperature at a constant rate for 45 minutes. Then the solid was removed from the furnace. A slide was prepared by taking the solid and crushing it in ethanol to make a suspension. Thereafter, the ethanol was allowed to evaporate. An x-ray powder diffraction (XRD) pattern was taken. FIG. 3 shows the XRD pattern of the slide. XRD data for OMS-3 are presented in Table 1 as follows:

TABLE 1

| XRD Data For OMS-3 | |
|---|---|
| Predicted (Å) | Observed (Å) |
| 13.1 | 12.7 |
| 6.4 | 6.3 |
| 4.2 | 4.2 |
| 3.3 | 3.1 |

These data show (4×4) tunnel structures in the manganese oxide octahedral molecular sieve produced in Example 1.

What is claimed is:

1. A manganese oxide octahedral molecular sieve possessing the composition:

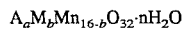

$$A_aM_bMn_{16-b}O_{32} \cdot nH_2O$$

wherein A is a +1 or +2 tunnel cation or combination thereof, $0<a\leq 8$, M is a +1, +2, +3 or +4 framework-substituting metal cation or combination thereof, $0<b<16$ and $n\geq 0$.

2. The molecular sieve of claim 1 wherein A is an alkali or alkaline earth metal cation.

3. The molecular sieve of claim 1 wherein A is a metal cation selected from the group consisting of Li, Na, K, Cs, Mg, Ca and Ba.

4. The molecular sieve of claim 1 wherein A is a metal cation of K.

5. The molecular sieve of claim 1 wherein M is a transition metal cation.

6. The molecular sieve of claim 1 wherein M is selected from the group consisting of Mg, Fe, Co, Ni, Cu, Ti, V, Cd, Mo, W, Cr, Zn, La, Ir, Rh, Pd and Pt.

7. A method of producing a manganese oxide octahedral molecular sieve possessing a (4×4) tunnel structure which comprises:

a) dissolving a manganese salt in an organic solvent to form a solution;

b) adding a permanganate salt to the solution to form a solid intermediate;

c) recovering the intermediate; and, d) heating the intermediate at a temperature effective to produce an octahedral molecular sieve possessing a (4×4) tunnel structure.

8. The method of claim 7 wherein the manganese salt is selected from the group consisting of $MnCl_2$, $Mn(NO_3)_2$, $MnSO_4$ and $Mn(CH_3COO)_2$.

9. The method of claim 7 wherein the permanganate salt is selected from the group consisting of $Na(MnO_4)$, $KMnO_4$ and $Mg(MnO_4)_2$.

10. The method of claim 7 further comprising the step of co-dissolving a transition metal salt in the organic solvent.

11. The method of claim 7 wherein the solvent corresponds to the general formula $R\text{-}[OH]_n$ where R is $C_1\text{-}C_6$ straight-chain alkyl and n is 1 or 2.

12. The method of claim 7 wherein the solvent is ethanol.

13. The method of claim 7 wherein the intermediate is heated from room temperature to a temperature ranging from about 200° to about 800° C.

14. The method of claim 7 wherein the intermediate is heated from room temperature to a temperature ranging from about 500° to about 700° C.

15. The method of claim 7 wherein heating is carried out for a period of time ranging from about 0.1 to about 10 hours.

16. The method of claim 7 wherein heating is carried out for a period of time ranging from about 0.5 to about 3.0 hours.

17. The method of claim 7 wherein prior to heating the intermediate the intermediate is aged at room temperature for a period of time ranging from about 1 to about 14 days.

* * * * *

UNITED STATES PATENT AND TRADEMARK OFFICE
CERTIFICATE OF CORRECTION

PATENT NO. : 5,578,282

DATED : November 26, 1996

INVENTOR(S) : Chi-Lin O'Young and Steven L. Suib

It is certified that error appears in the above-indentified patent and that said Letters Patent is hereby corrected as shown below:

In Column 1, line 9 "(3x4)" should be --(4x4)--.

Signed and Sealed this

Fourth Day of March, 1997

Attest:

BRUCE LEHMAN

*Attesting Officer*    *Commissioner of Patents and Trademarks*